United States Patent
Ottesen et al.

(10) Patent No.: US 6,768,607 B2
(45) Date of Patent: Jul. 27, 2004

(54) ADAPTIVE DUAL-FREQUENCY NOTCH FILTER

(75) Inventors: Hal Hjalmar Ottesen, Rochester, MN (US); Gordon James Smith, Rochester, MN (US)

(73) Assignee: Hitachi Global Storage TEchnologies Netherlands B.V., Amsterdam (NL)

(*) Notice: Subject to any disclaimer, the term of this patent is extended or adjusted under 35 U.S.C. 154(b) by 517 days.

(21) Appl. No.: 09/934,767

(22) Filed: Aug. 22, 2001

(65) Prior Publication Data

US 2003/0058558 A1 Mar. 27, 2003

(51) Int. Cl.[7] .............................................. G11B 5/596
(52) U.S. Cl. ................................ 360/77.02; 360/78.04; 360/75; 708/300; 369/44.28; 369/44.29
(58) Field of Search .............................. 360/27, 31, 75, 360/77.02, 78.04, 77.04; 369/44.28, 44.29; 708/322, 300, 3

(56) References Cited

U.S. PATENT DOCUMENTS

| | | | |
|---|---|---|---|
| 5,278,780 A | 1/1994 | Eguchi | 708/322 |
| 5,479,362 A | 12/1995 | Sun et al. | 708/300 |
| 5,530,660 A | 6/1996 | Sun et al. | 708/300 |
| 6,014,285 A | * 1/2000 | Okamura | 360/78.04 |
| 6,032,166 A | 2/2000 | Signell et al. | 708/3 |
| 6,141,672 A | 10/2000 | Driendl et al. | 708/320 |

* cited by examiner

Primary Examiner—David Hudspeth
Assistant Examiner—Dan I. Davidson
(74) Attorney, Agent, or Firm—Patrick G. Billig

(57) ABSTRACT

A disk drive comprises an actuator servo control system including at least one disk, an actuator structure comprising at least transducer head for writing and/or reading data from the disk and providing a transducer head position error signal (PES), and a servo compensator applying a servo control algorithm to the PES to produce a servo control signal. An adaptive elliptic notch filter controller is adapted to analyze the PES for a transducer head at a disk track radii, identify resonant disturbances present in the PES, select two adjacent resonant disturbances having first and second frequencies, ascertain coefficients of at least a fourth-order elliptic notch filter transfer function having first and second zero-notches with frequencies substantially at the first and second resonant frequencies, apply the at least fourth-order elliptic notch filter transfer function with the ascertained coefficients in the servo system to thereby substantially attenuate the selected adjacent resonant disturbances.

23 Claims, 7 Drawing Sheets

ADAPTIVE DUAL-FREQUENCY NOTCH FILTER

THE FIELD OF THE INVENTION

The present invention relates generally to disk drives, and more particularly to disk drives having an actuator servo control system incorporating an adaptive elliptic notch filter system to identify and attenuate resonant disturbances present in the actuator servo control system.

BACKGROUND OF THE INVENTION

The seeking and tracking performance of disk drive actuator servo control systems is becoming evermore critical as disk track densities and spindle rotational velocities continue to increase. Unfortunately, one consequence of increased spindle rotatational velocities, along with decreases in both access times and transducer head flyheights, is an increase in resonant disturbances in drive actuator structures, resulting in even greater demands on the actuator servo control system.

An actuator resonant disturbance is a physical disturbance that vibrates, or "rings," around a particular constant or nearly constant frequency. Spectral analysis of a disk drive position error signal (PES) typically shows a complex resonant-disturbance structure involving multiple resonant disturbances in the PES. For instance, increased windage and spindle motor vibrations cause increased actuator E-block resonant disturbances (e.g., butterfly mode, M-mode, end-arm mode, etc.) and suspension resonances (e.g., torsional and bending). The presence of resonant disturbances in the PES results in reduced actuator servo-positioning ability and increased track mis-registration (TMR).

Therefore, to improve actuator servo control system performance and reliability, it is desirable to attenuate, or remove, the resonant disturbances from the PES. Conventional techniques for attenuating resonant disturbances in closed-loop servo systems utilize notch filters. A notch filter is a filter that can attenuate a resonant disturbance at a particular frequency, or in other words, "notch it out" of the frequency spectrum. If more than one resonant disturbance frequency is present, multiple notch filters are placed in series with one another in the closed-loop servo system, with each filter "tuned" to attenuate a different resonant disturbance.

However, while conventional filtering techniques can be effective at attenuating resonant disturbances, the use of too many notch filters can actually create servo system instability. Servo-system stability is often measured by its phase-margin, with a minimum phase margin of approximately 30 to 35 degrees being satisfactory. A notch filter has the inherent characteristic of creating a phase-lag that results in a corresponding decrease in a servo system's phase margin. Consequently, the more notch filters that are required, the smaller the servo system phase-margin becomes and the less stable the system becomes.

Furthermore, conventional filtering techniques are not adaptive to the dynamic nature of resonant disturbances. The frequencies of resonant disturbances are dependent on many factors, including temperature, and can vary under different disk drive operating conditions. Thus, while conventional filtering techniques might be effective at filtering resonant disturbances under one set of disk drive operating conditions, they can be ineffective under other conditions.

Thus, there is a need for a disk drive system having an actuator servo system with a resonant disturbance attenuation system that both minimizes phase-margin reduction and is adaptive to the varying resonant disturbance frequencies present during disk drive operation.

SUMMARY OF THE INVENTION

One aspect of the present invention provides a disk drive and a method of attenuating resonant disturbance frequencies present in the disk drive actuator servo control system. The disk drive includes a servo control system and an adaptive resonant disturbance attenuator. The servo control system includes at least one disk having a plurality of radially-situated data tracks, an actuator structure, and a servo compensator. The actuator structure includes at least one transducer head for writing and/or reading data from the disk data tracks, a flexible suspension, an arm structure, and a voice coil motor, and provides a transducer head position error signal (PES). The servo compensator applies a servo-control algorithm to the PES to thereby produce a servo-control signal. The adaptive resonant disturbance attenuator is adapted to analyze the PES for a transducer head at a data track radii and identify resonant disturbances present in the PES. The adaptive resonant disturbance attenuator is further adapted to select two adjacent resonant disturbances having a first and a second resonant frequency, and to ascertain the coefficients of at least a fourth-order elliptic notch filter transfer function having a first zero-notch with a frequency substantially at the first resonant disturbance frequency and a second zero-notch with a frequency substantially at the second resonant disturbance frequency. The adaptive resonant disturbance attenuator is adapted to apply the ascertained coefficients to the at least fourth-order elliptic notch filter transfer function to thereby generate a tuned fourth-order digital elliptic notch filter and to apply the tuned fourth-order digital elliptic notch filter in the servo system to thereby substantially attenuate the selected adjacent resonant disturbances.

In one embodiment, the adaptive resonant disturbance attenuator analyzes the position error signals for a plurality of transducer heads at one or more selected data track radii and generates a plurality of tuned fourth-order digital elliptic notch filters to thereby substantially attenuate a plurality of selected resonant disturbances associated with each transducer head at each selected data track radii.

In one embodiment, the adaptive resonant disturbance attenuator applies the tuned fourth-order digital elliptic notch filter to the PES to thereby substantially attenuate from the PES the selected adjacent disturbances. In one embodiment, the adaptive resonant disturbance attenuator applies the attenuator tuned fourth-order digital elliptic notch filter to the servo control signal to thereby substantially attenuate from the servo control signal the selected adjacent resonant disturbances.

In one embodiment, the adaptive resonant disturbance attenuator includes a spectral disturbance frequency analyzer, a notch filter coefficient controller and a tunable digital elliptic notch filter. In one embodiment, the spectral disturbance frequency analyzer measures the PES for a transducer head at a data track radii, computes form the PES a non-repeatable position error signal (NRRO), and computes from the NRRO a spectrum of estimated resonant disturbance frequencies present in the NRRO. In one embodiment, the spectral disturbance frequency analyzer computes from a limited number of frequency bands within the NRRO the spectrum of estimated resonant disturbance frequencies.

In one embodiment, the notch filter coefficient controller analyzes the spectrum of estimated resonant disturbance frequencies and estimates the frequencies of resonant disturbances present in the spectrum of disturbance frequencies. The notch filter coefficient controller selects two adjacent resonant disturbances having a first and second resonant frequency and ascertains coefficients of a fourth-order elliptic notch filter transfer function having a first zero-notch with a frequency substantially at the frequency of the first selected resonant disturbance frequency and a second zero-notch with a frequency substantially at the frequency of the second selected resonant disturbance frequency. In one embodiment, the ascertained coefficients are stored in a memory.

In one embodiment, the tunable digital elliptic notch filter circuit receives the ascertained coefficients from the notch filter coefficient controller and applies the coefficients to a fourth-order elliptic notch filter transfer function to thereby generate a tuned fourth-order digital elliptic notch filter having a first zero-notch with a frequency substantially at the first selected resonant disturbance frequency and a second zero-notch with a frequency substantially at the second selected resonant disturbance frequency. The tuned fourth-order digital elliptic notch filter is then applied in the servo system to thereby substantially attenuate the selected adjacent resonant disturbances.

One aspect of the present invention provides a method for attenuating resonant disturbances in a disk drive comprising at least one disk having a plurality of radii and an actuator servo control system including a servo compensator and an actuator structure having at least one transducer head for writing and/or reading data form the disk surface, a flexible suspension, an arm structure and a voice coil motor, and providing a transducer head position error signal (PES). The method includes analyzing the PES for a transducer head at a disk radii, identifying resonant disturbances present in the PES, and selecting at least two adjacent resonant disturbances having a first and second resonant frequency. The method further includes ascertaining coefficients of at least a fourth-order digital elliptic notch filter transfer function having a first zero-notch with a frequency substantially at the first resonant disturbance frequency and a second zero-notch with a frequency substantially at the second resonant frequency, and applying the at least fourth-order digital elliptic notch filter transfer function with the ascertained coefficients in the servo system to thereby substantially attenuate the selected adjacent resonant disturbances.

A disk drive according to the present invention provides more effective attenuation of resonant disturbances present in disk drive servo systems by performing a continuous in situ analysis of transducer head position error signals (PES) to identify dynamic resonant disturbance frequencies and by tuning digital elliptic notch filters to attenuate the identified resonant disturbance frequencies. Adaptive tuning of digital elliptic notch filters to match dynamic resonant disturbance frequencies provides more effective attenuation of resonant disturbances than use of static filters tuned to match predetermined resonant disturbances. Additionally, by utilizing digital elliptic notch filters, the present invention improves servo system stability by preserving the servo system's phase-margin.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
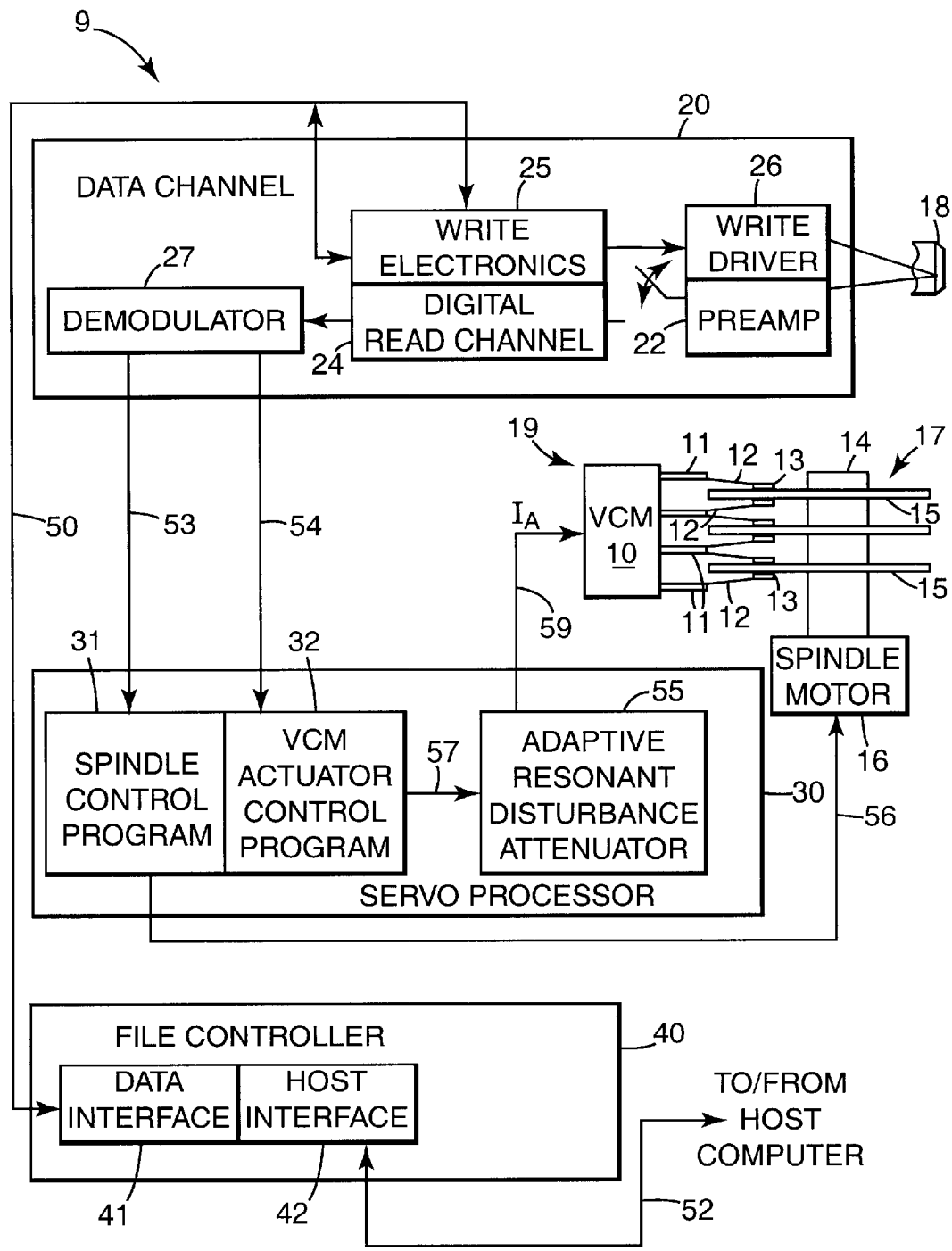
FIG. 1 is a block and schematic diagram illustrating one embodiment of a disk drive according to the present invention.

One embodiment of a disk drive is illustrated generally at 9 in FIG. 1. Disk drive 9 includes an actuator assembly 19 having a voice coil motor (VCM) 10, attached arms 11, and flexible suspensions 12. Transducer heads 13 are disposed at the end of flexible suspensions 12. A spindle assembly 17 includes a hub 14, rigid disks 15, and a spindle motor 16. The transducer heads 13 "fly" on both the top and bottom surfaces of disks 15 as they read and/or write data on magnetic material deposited on the surfaces of the disks. The transducer heads 13 fly over or under the confronting disk surface, supported by a bearing or film of fluid, such as air, induced between the disk and the head in response to the high-speed rotation of the disk.

An electromagnetic transducer 18 supported by each transducer head 13 is connected to a data channel 20. Read and write electronics portions of the data channel 20 are connected to an individual transducer head 13 by conventional means (not shown), such as a flexible cable. As a disk 15 rotates adjacent to an individual transducer head 13, a continuous signal is read from a track on the surface of the disk by electromagnetic detection in the head transducer 18 and then is amplified using a preamplifier 22. The output of preamplifier 22 is sampled and fed to a digital read channel 24, which filter and equalize the amplified signal and which typically employ a specific detection procedure to detect data in the amplified, processed signal. Digital read channel 24 may also include clocking circuits to extract a data clock.

Data channel 20 also includes write electronics 25 which may precondition a signal to be written on a disk track. Write electronics 25 provide the signal which is to be recorded to a write driver 26 that is conventionally connected to a head transducer 18 for writing onto a disk track. In one embodiment employing an inductive head, a single transducer is used for both read and write functions. In another embodiment employing a magneto resistive head, separate transducers are used for reading and writing data.

Disk drive 9 also contains processing components, including a servo processor 30 and a file microprocessor 40. Conventionally, servo processor 30 may include an invokable application run on a separate microprocessor or file microprocessor 40. In the embodiment illustrated in FIG. 1, servo processor 30 includes a spindle control program 31 and a VCM actuator control program 32. Servo processor 30 controls the positioning of the actuator assembly 19, including VCM 10, arms 11, and suspensions 12, to position the transducer heads 13 at fixed radial locations over the surfaces of disks 15. The positioning functions of the VCM actuator control program 32, include moving heads 13 to an addressed concentric track during a track seeking operation and maintaining the heads in alignment with a selected track during a track following operation. Both the track seeking and track following operations typically employ servo signals written continuously on a dedicated disk surface or into dedicated servo sectors on each of the disk surfaces. These servo signals are respectively read by one or all of the heads 13 and fed back to servo processor 30 through digital read channel 24 and demodulator 27. The VCM actuator control program 32 functions to move a head 13 to a desired disk track location and to cause the head to remain aligned with or follow the selected track by first analyzing the associated servo signal to produce a head position error signal (PES) and then acting to reduce the magnitude of the PES. The trajectory of the transducer heads 13 forms an arc. The velocity along the arc has both radial and tangential velocity components relative to the track. The VCM actuator control program 32 implements track following, track seeking, head registration, and head parking functions, which are well understood by those of ordinary skill in the art.

File controller 40 includes a data interface section 41 which performs interface functions, including encoding and decoding of data to be written to and read from a disk; a host interface section 42 for providing control and data information to and receiving commands and data from a host computer (not shown).

In one embodiment, servo processor 30 includes an adaptive resonant disturbance attenuator 55 according to the present invention. However, the adaptive resonant disturbance attenuator 55 can be stored according to design conditions in any of the microprocessor resources of the disk drive 9, such as memory contained in file controller 40 or a separate microprocessor, or other memory separate from file controller 40 and servo processor 30.

The major interconnections between the components of disk drive 9 illustrated in FIG. 1 include a data signal path 50 between the data interface section 41 of file controller 40 and the read and write electronics 24 and 25 of data channel 20. A command/data signal path 52 connects disk drive 9 of FIG. 1 through its host interface 42 with a host computer (not shown). Demodulated servo signals are provided to the spindle control program 31 and VCM actuator control program 32, respectively, from demodulator 27 over signal paths 53 and 54. A signal path 56 conducts a spindle motor speed control signal from the spindle control program 31 to spindle motor 16. A signal path 57 conducts a servo control signal from the VCM actuator control program 32 to adaptive resonant disturbance attenuator 55. Adaptive resonant disturbance attenuator 55 removes selected resonant disturbances from the servo control signal and conducts a filtered, or compensated, servo control signal over a signal path 59 to VCM 10.

Figure 2:
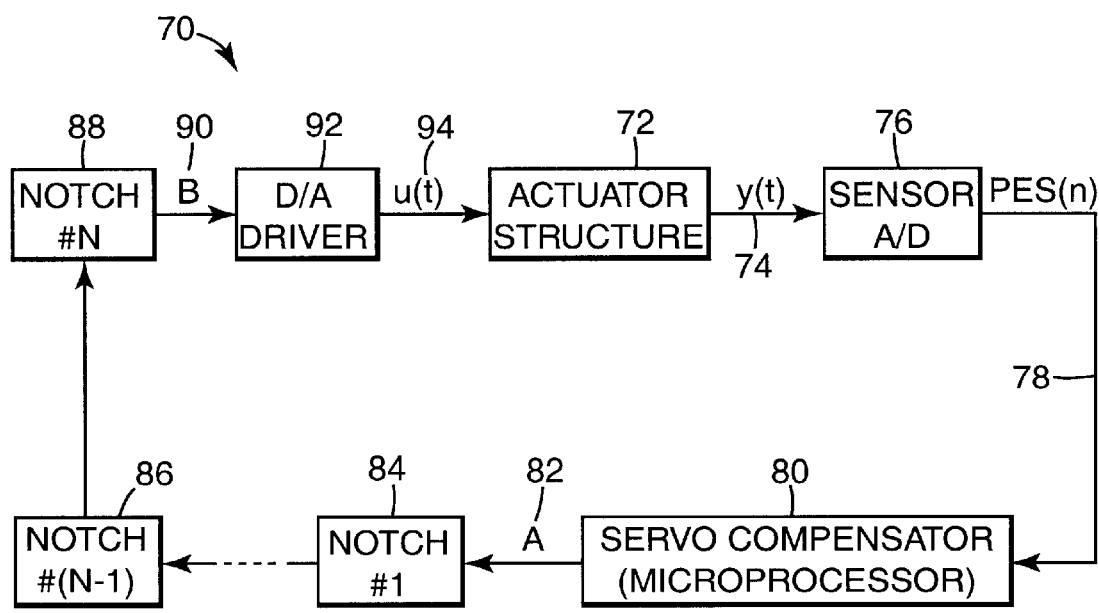
FIG. 2 is a block and schematic diagram illustrating a typical prior art disk drive closed-loop actuator servo control system.

FIG. 2 illustrates in block diagram form a conventional filtering method using multiple notch filters to attenuate multiple resonant disturbances in a conventional closed-loop actuator servo control system 70. An actuator structure 72 typically comprises transducer heads 13, arms 11, flexible suspensions 12, and a VCM 10. Actuator structure 72 provides a radial error-motion signal y(t) 74 of the transducer head to an analog-to-digital (A/D) sensor 76. A/D sensor 76 converts the radial error-motion signal y(t) 74 to a digital head position error signal PES(n) 78 and provides the PES(n) to a microprocessor-based servo compensator 80. Servo compensator 80 applies a servo-control algorithm to PES(n) 78 to produce a servo control signal A indicated at 82. A series of static notch filters, each tuned to attenuate a pre-determined resonant disturbance frequency, such as notch filters 84, 86 and 88, filter servo control signal A indicated at 82 to produce a filtered servo control signal B indicated at 90 which is provided to a digital-to-analog (D/A) driver 50. D/A driver 92 converts the filtered servo control signal B indicated at 90 to an analog filtered servo control signal u(t) 94 which is received by actuator structure 72 and used to correct the position of transducer head 13.

The conventional notch-filtering technique of FIG. 2 assumes that the resonant disturbance frequencies lie well outside the servo-bandwidth. For example, if the servo-bandwidth is approximately 800 Hz, the resonant disturbance frequencies should be greater than approximately 2,000 Hz. As an illustrative example, if four different resonant disturbance frequencies exist within in a given disk drive, (e.g., at 2,500 Hz, 5,500 Hz, 6000 Hz, and 6,300 Hz), four notch filters would be placed in the servo loop, with each filter "tuned" to match one of the four resonant disturbance frequencies to thereby attenuate each resonant disturbance frequencies.

While the conventional notch filtering technique of FIG. 2 can be effective at filtering resonant disturbances, it has two primary shortcomings. First, the placement of multiple notch filters in a servo feedback loop can potentially lead to servo system instability. The stability, or dynamic performance, of a closed-loop servo system is often measured by its phase-margin. The phase-margin is the phase difference between 180 degrees and the phase-shift of the open-loop servo-system transfer function. The phase-margin is measured at the 0-dB crossover frequency of the magnitude response of the open-loop transfer function. A minimum phase-margin of approximately 30 to 35 degrees is generally required for satisfactory disk drive servo performance. At a phase-margin of approximately 20 degrees, a servo-system will begin to become unstable (i.e., less damped with ringing and jitteriness to disturbances). At a phase-margin of zero degrees, a servo system will suffer from positive feedback and will become self-destructing.

Unfortunately, an inherent characteristic of notch filters is that they create a phase-lag, which in-turn, leads to a reduction in the servo-system phase-margin. Furthermore, if multiple notch filters are utilized, the phase-lag of each notch filter is cumulative and each notch filter contributes to an incremental reduction in a servo-system's phase margin. Thus, the more notch filters that are placed in a feedback loop, such as between points "A" and "B" illustrated in FIG. 2, the more the servo-system phase margin will be reduced and the more unstable the actuator servo system will become. Consequently, the filtering technique illustrated in FIG. 2 is limited in the quantity of resonant disturbances that can be attenuated before the system begins to lose stability. For more information regarding phase-margin, see for example, G. F. Franklin, J. D. Powell, and M. L. Workman, *Digital Control of Dynamic Systems,* Third Edition, Addison Wesley (1998), at 36–38.

The second shortcoming of the conventional notch filtering technique of FIG. 2 is that the notch filters are designed to attenuate a disturbance having a pre-determined frequency and are not adaptive to frequency variations present in resonant disturbances. Actuator resonant-disturbance frequencies are dependent upon many factors including, but not limited to, the material used in the E-block and suspension, the manufacturing process (e.g., milling of the E-block and swaging of the suspensions to the arms of the E-block), the inner and outside arms of the E-block, the dampening ratio of each head/suspension/arm structure, and the temperature. As a result, there can be significant variations in both static resonant disturbance frequencies between different disk drives of similar manufacture and in dynamic resonant disturbance frequencies within a single disk drive when operated under different ambient conditions. Such frequency variations can be up to several 100 Hz in magnitude.

Consequently, while the notch filtering technique of FIG. 2 effectively attenuates resonant disturbances whose frequencies are substantially equivalent to the filters' design frequencies, the technique does not adequately address the dynamic nature of resonant disturbance frequencies.

Figure 3:
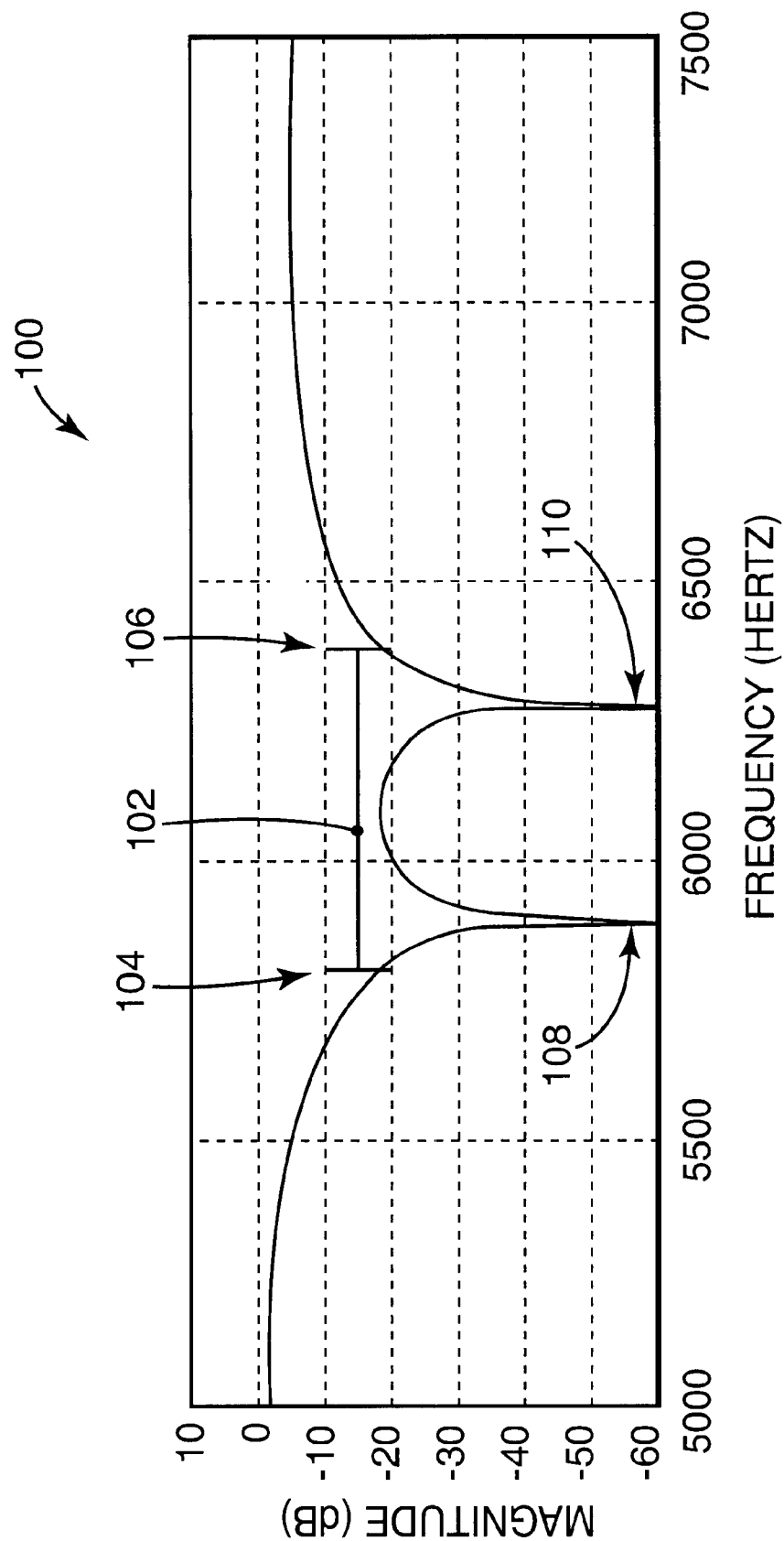
FIG. 3 is a graph illustrating the magnitude vs. frequency response of an example fourth-order elliptic notch filter.

The present invention utilizes an elliptic filter transfer function characteristic of having two or more deep local notches, or zero-notches, within a shallower, but broader, global notch. FIG. 3 illustrates a frequency vs. magnitude response 100 of an example fourth-order elliptic notch filter. The example fourth-order elliptic notch filter is designed to have a global notch 102 between a lower (−20 db) stopband-edge frequency 104 at 5.8 kHz and an upper (−20 db) stopband-edge frequency 106 at 6.4 kHz. The example filter has a first deep local notch 108 at a frequency of 5.9 kHz and a second deep local notch 110 at a frequency of 6.3 kHz. While the elliptic filter transfer function as illustrated in FIG. 2 is a fourth-order filter, a higher order transfer function can also be utilized, such as an eighth-order filter, which has four deep local notches within a single global notch.

An actuator servo control system according to the present invention employs an adaptive elliptic notch filter wherein the deep local notches, or zero-notches, in the elliptic notch filter transfer function can be precisely positioned at any desired frequency. By determining the frequencies of resonant disturbances present in the servo system and utilizing the method described in detail below to precisely position the elliptic notch filter transfer function zero-notches at selected multiple frequencies of resonant disturbances, the present invention utilizes elliptic notch filters to attenuate multiple resonant disturbances with a single elliptic notch filter. Thus, an actuator servo control system according to the present invention requires fewer notch filters than conventional filtering techniques to attenuate a given number of resonant disturbances. Accordingly, the actuator servo control system according to the present invention produces a smaller accumulated phase-lag and, consequently, less of a reduction in the servo system phase margin than conventional filtering techniques, thereby resulting in improved servo system stability.

Figure 4:
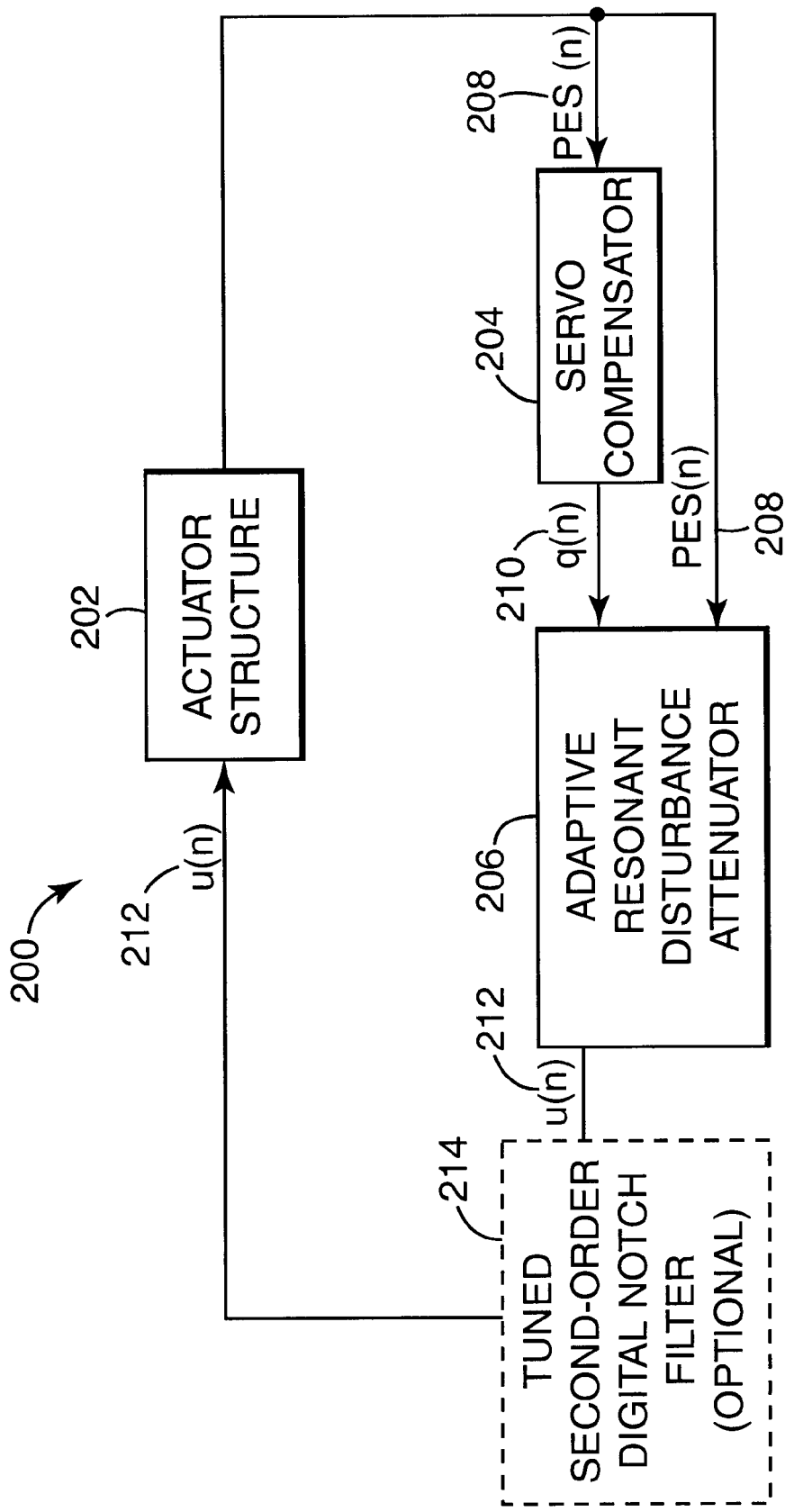
FIG. 4 is a block and schematic diagram illustrating one embodiment of a disk drive actuator servo control system according to the present invention.

One embodiment of an actuator servo control system according to the present invention is illustrated generally at 200 in FIG. 4. Actuator servo control system 200 comprises an actuator structure 202, a servo compensator 204, and an adaptive resonant disturbance attenuator 206. In one embodiment, actuator structure 202 includes transducer heads 13, arms 11, flexible suspensions 12, and a VCM 10, and provides a transducer head position error signal PES(n) 208. Servo compensator 204 receives PES(n) 208 and applies a servo-control algorithm to produce an output control signal q(n) 210. Adaptive resonant disturbance attenuator 206 receives and analyzes PES(n) 208, determines the frequencies of resonant disturbances present in PES(n) 208 and selects a first and second resonant disturbance frequency for attenuation. Adaptive resonant disturbance attenuator 206 then generates a tuned fourth-order digital elliptic notch filter with first and second zero-notches having frequencies substantially at the frequencies of the first and second selected resonant disturbances. Adaptive resonant disturbance attenuator 206 then applies the tuned fourth-order digital elliptic notch filter to servo control signal q(n) 210 to produce a filtered output servo signal u(n) 212. Actuator structure 202 then receives filtered servo control signal u(n) 212 to correct transducer head 13 position. In one embodiment, actuator servo control system 200 further includes a tuned second-order digital Butterworth or elliptic notch filter 214. Second-order notch filter 214 is applied to further attenuate resonant disturbances present in servo control signal u(n) 212 before servo control signal u(n) 212 is received by actuator structure 202.

Figure 5:
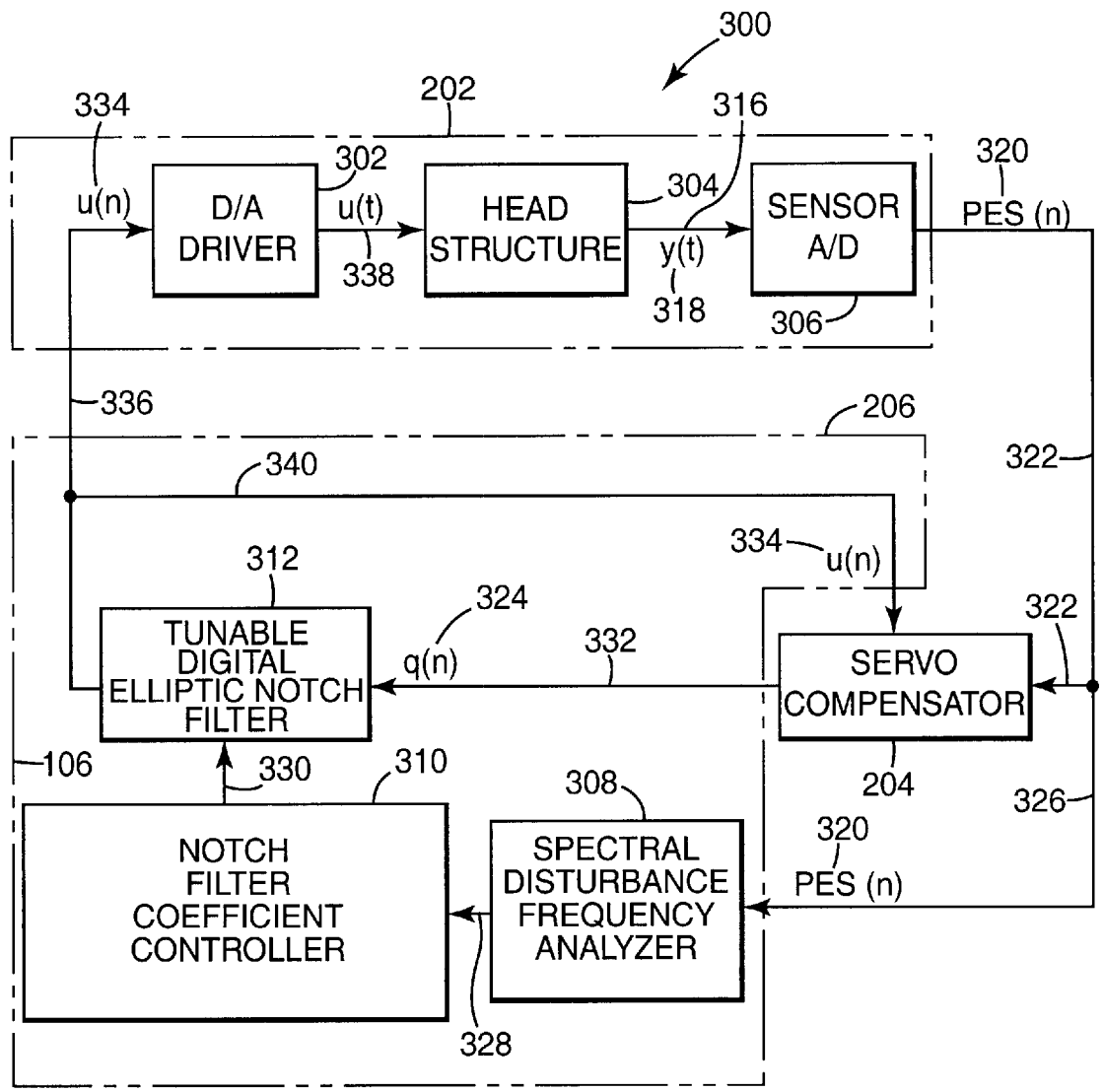
FIG. 5 is a block and schematic diagram illustrating one embodiment of an adaptive disk drive actuator servo control system according to the present invention.
Figure 6:
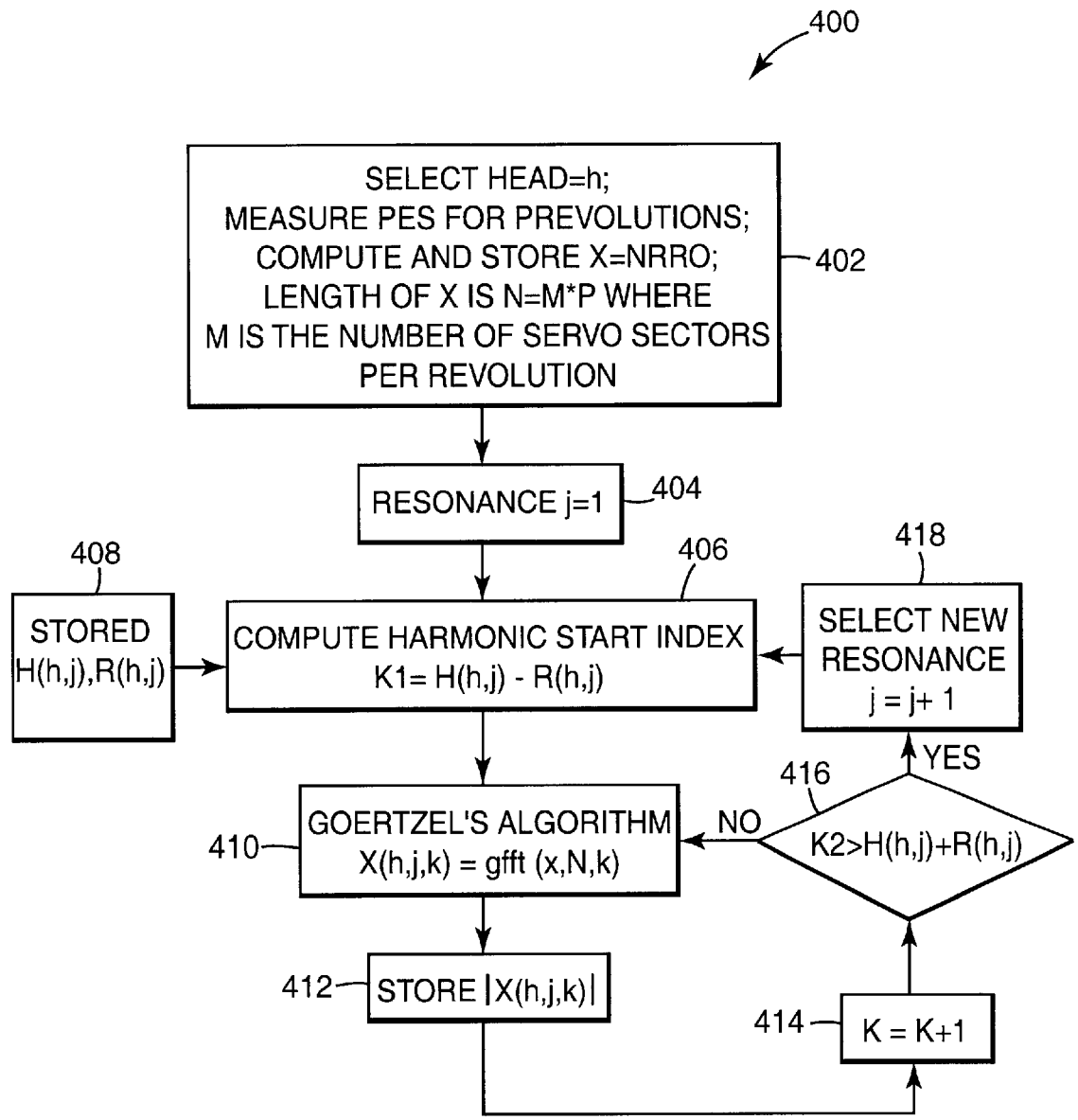
FIG. 6 is a flow diagram illustrating a process for computing a disturbance frequency spectrum for a recording head.
Figure 7:
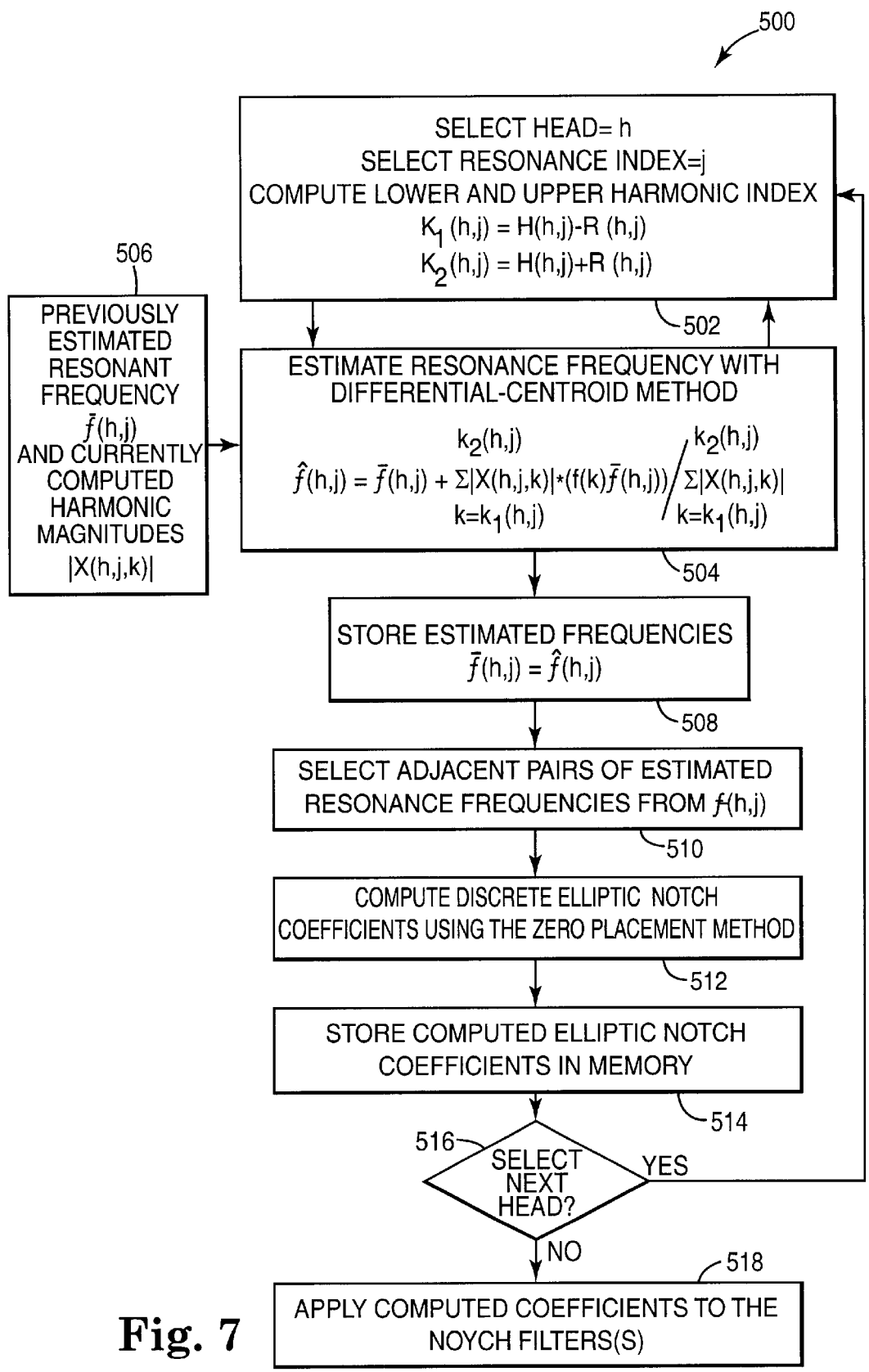
FIG. 7 is a flow diagram illustrating a process for estimating resonant frequencies and computing dual-frequency elliptic notch filter coefficients.

One embodiment of an actuator servo control system 300 according to the present invention is illustrated in block diagram form in FIG. 5 and is controlled by a process 400 and a process 500, which are respectively illustrated in flow diagram form in FIG. 6 and FIG. 7. Even though actuator servo control system 300 is described below as generating only a single fourth-order elliptic notch filter to be applied to a servo control signal for a single transducer head at a single track radii, the present invention provides for precise adaptive dual-frequency notch filter tuning for multiple transducer heads at one or more data track radii.

In one embodiment, a plurality of tuned fourth-order digital elliptic notch filters are generated and applied to a servo control signal for a single transducer head at a given track radii to thereby substantially attenuate a plurality of resonant disturbances present at a given track radii. In another embodiment, a plurality of tuned fourth-order digital elliptic notch filters are generated and applied to servo control signals for a single transducer head at multiple data radii track. In another embodiment, a plurality of tuned fourth-order digital elliptic notch filters are generated and applied to a plurality of servo control signals for a plurality of transducer heads at a plurality of track radii. In one embodiment, multiple second-order Butterworth or elliptic notch filters are used in conjunction with multiple fourth-order elliptic notch filters. Additionally, higher order elliptic notch filters could also be utilized, such an eighth-order elliptic notch filter having four deep local notches within a single global notch. However, to clarify discussion and illustration, actuator servo control system 300 is described below as generally having a single tuned fourth-order digital elliptic notch filter being generated to attenuate two adjacent resonant disturbances present in the position error signal for a single transducer head at a single data track.

As illustrated by FIG. 5, actuator servo control system 300 comprises an actuator structure 202, a servo compensator 204 and an adaptive resonant disturbance attenuator 206. Actuator structure 202 further comprises a digital-to-analog (D/A) driver 302, a head structure 304, and an analog-to-digital (A/D) sensor 306. Head structure 304 includes transducer heads 13, arms 11, flexible suspensions 12, and VCM 10. Adaptive resonant disturbance attenuator 206 further comprises a spectral disturbance frequency analyzer 308, a notch filter coefficient controller 310, and a tunable digital elliptic notch filter 312.

Head structure 304 is coupled via a line 316 to A/D sensor 306. A/D sensor 306 receives an analog radial error-motion signal y(t) 318 for a transducer head 13 from head structure 304 and demodulates y(t) 318 to a digital transducer head position error signal PES(n) 320, where n represents a sampling index. Servo compensator 204 is coupled to and receives the head position error signal PES(n) from A/D sensor 306 via a line 322 and applies a servo-control algorithm to head position error signal PES(n) 320 to produce a digital servo control signal q(n) 324.

Spectral disturbance frequency analyzer 308 receives PES(n) 320 via a line 326 and measures PES(n) 320 values over several disk revolutions at a selected track radii and stores the values in a memory. In general, PES measurements consist of repeatable (i.e., synchronous) values and non-repeatable (i.e., non-synchronous) values. Typically, most resonant disturbances are non-synchronous, or non-repeatable, with respect to disk rotation. PES values associated with non-repeatable disturbances of the transducer head are termed non-repeatable runout (NRRO) values. Spectral disturbance frequency analyzer 308 computes from the stored PES(n) 320 values a non-repeatable PES, or NRRO. In one embodiment, spectral frequency analyzer 308 utilizes Goertzel's method to analyze the spectral frequency content of the computed NRRO to calculate a spectrum of estimated resonant disturbance frequencies present in the NRRO. Goertzel's algorithm is an elegant, recursive method with low computational requirements, that computes only one harmonic frequency component at a time. A relevant reference is S. K. Mirtra, Digital Signal Processing—A Computer-Based Approach, McGraw-Hill, (1998), pp. 520–23. The below described FIG. 6 illustrates in flow diagram form a process 400 implementing the disturbance frequency computation process utilized by spectral disturbance frequency analyzer 308.

Notch filter coefficient controller 310 is coupled to and receives the spectrum of estimated resonant disturbance frequencies from spectral disturbance frequency analyzer 308 via a line 328. Notch filter coefficient controller 310 analyzes the spectrum of estimated resonant disturbance frequencies of the NRRO and computes the center of each resonant disturbance frequency. In one embodiment, coefficient controller 310 selects two adjacent resonant disturbance frequencies and computes a set of coefficients of a fourth-order elliptic notch filter transfer functions wherein the fourth-order elliptic notch filter transfer function has first and second zero-notches with frequencies substantially at the first and second selected resonant disturbance frequencies. The below described FIG. 7 illustrates the calculation of the center of the resonant disturbance frequencies and the notch filter coefficient calculation process utilized by notch coefficient controller 310 in flow diagram form as process 500.

Tunable digital elliptic notch filter 312 receives the calculated set of coefficients from notch filter coefficient controller 310 via a line 330 and applies the coefficients to a fourth-order elliptic notch filter transfer function to thereby generate a "tuned" fourth-order digital elliptic notch filter having first and second zero notches with frequencies substantially at the first and second selected resonant disturbance frequencies. Tunable digital elliptic notch filter 312 then receives servo control signal q(n) 324 from servo compensator 104 via a line 332 and applies the "tuned" fourth-order elliptic notch filter to head position control signal q(n) 324, to thereby attenuate the two selected adjacent disturbance resonances from the output signal q(n) 324 and produce a filtered servo control signal u(n) 334.

D/A driver 302 receives filtered digital servo control signal u(n) 334 from tunable digital elliptic notch filter circuit 312 via a line 336. D/A driver 302 converts the filtered servo control signal u(n) 334 to an analog filtered servo control signal u(t) and applies the analog filtered servo control signal u(t) to head structure 304 via a line 338 to thereby correct the associated transducer head position. Servo compensator 204 also receives filtered servo control signal u(n) 334 from tunable digital elliptic notch filter 312 via a feedback loop 340.

Disturbance frequency computation process 400 utilizes a characteristic of disk drives wherein mechanical resonant disturbances in head/suspension/arm/coil structures reside within narrow frequency ranges (bands) having widths of only a few 100 Hz. Table I below illustrates the frequencies of typical transducer head/suspension/arm/VCM structure resonant disturbances in a modern-type disk drive.

TABLE I

Typical head/suspension/arm/coil assembly resonances in a modern disk drive

| Mode | Frequency (Hz) | Tolerance (Hz) | Comments |
| --- | --- | --- | --- |
| Torsional (T1) | 2500 | +/−75 | End-arm is 2–3 times less in-pack |
| Butterfly | 5000 | +/−200 | All heads in the same direction |
| M-mode | 5900 | +/−80 | Heads 0,1 and 2,3; same phase |
| End arm | 6300 | +/−200 | Heads 0–3 same dir., 4 opposite |
| Coil bending | 1600 | +/−50 | Flexing of legs on back of actuator |
| Tangential jitter | 810, 1,800 | +/−100, +/−400 | 2-headed arm |
| Tangential jitter | 1,030, 1,950 | +/−100, +/−400 | 1-headed arm |

Since mechanical resonant disturbances typically lie within these narrow frequency bands, it is not necessary for disturbance frequency computation process 400 to compute the full disturbance frequency spectrum of an NRRO, but only portions thereof. As an illustrative example, consider a disk drive having M=60 sectors that is spinning at an RPM=15,000 revolutions per minute. The example disk drive will have a sampling frequency (fs)=M*RPM/60=15,000 Hz. If the NRRO is computed from P=10 revolutions of sampling PES measurements, the separation between the frequency harmonics in the frequency spectrum (df)=fs/(P*M)=25 Hz. Thus, in this example, only nine adjacent harmonics frequencies will cover a frequency-span of +/−100 Hz.

FIG. 6 illustrates in flow diagram form the disturbance frequency computation process 400 for a given transducer head h, which begins at step 402. At step 402, for disk drives comprising multiple transducer heads, a transducer head h, is first selected. The position error signal (PES) for head h is then measured for a quantity of P revolutions at a rate of M samples per revolution. In step 402, the non-repeatable PES(NRRO) is computed and stored, where x=NRRO and the length of x is N=M*P, where M is the number of servo sectors per disk revolution.

Process 400 then proceeds to step 404 where a resonant index j is set to j=1 for transducer head=h. Three or more head/suspension/arm resonances may be selected for notch filtering (i.e., j=1, 2, 3, . . . ) These resonances are usually 2.5 or more times the open-loop servo bandwidth, which in practice is approximately 600 Hz to 800 Hz. Therefore, resonance frequencies below approximately 1,500 Hz to 2,000 Hz cannot be notched out because of excessive loss of phase-margin leading to servo instability such as discussed above in the Background of the Invention section of the present specification.

Process 400 then proceeds to step 406 where stored values of a corresponding harmonic index H(h,j) and a half-index range R (h,j) are obtained from block 408. At step 406, the lower index K1 is computed. Process 400 then proceeds to step 410, where a single harmonic component of the discrete Fourier transform (DFT) is computed in block 410, and its magnitude is stored in block 412.

Process 400 then proceeds to step 414, where harmonic frequency index k is incremented by a value of one. Process 400 then proceeds to step 416, where the incremented value of harmonic frequency index k is compared with the end-harmonic frequency index k2=H(h,j)+R(h,j) for resonant index j=1. If the value of harmonic frequency index k is less than k2, process 400 returns to step 410 where the next harmonic DFT component is computed and its magnitude stored in block 412. Steps 410, 412, 414 and 416 are repeated until the value of harmonic frequency index k is greater than end-harmonic frequency index k2.

When the value of harmonic frequency index k is greater than end-harmonic frequency index k2, process 400 proceeds to step 418. At step 418, resonant index j is incremented by a value of one and process 400 returns to step 406 where the DFT component computation process of steps 406, 410, 414 and 416 is repeated. The resonance indices and their specific ranges in block 408 are determined and stored at manufacturing time by similar, but more extensive measurements.

In one embodiment, notch filter coefficient computation Process 500 employs a variant of a "centroid" method, to estimate the center of a resonant disturbance frequency. This variant of "centroid" method is less sensitive to bias, and is herein referred to as the "differential-centroid method."

An example differential-centroid method implementation is represented the following Equation I:

$$\hat{f}(h,j) = \bar{f}(h,j) + \sum_{k=k1(h,j)}^{k2(h,j)} |X(h,j,k)| \cdot (f(k)\bar{f}(h,j)) / \sum_{k=k1(h,j)}^{k2(h,j)} |X(h,j,k)| \qquad \text{Equation I}$$

where the frequency estimate is, $\hat{f}(h,j)$;

the previous (stored) frequency estimate is $\bar{f}(h,j)$;

the magnitude of the k-th complex Discrete Fourier Transform (DFT) component is $|X(h,j,k)|$;

the k-th harmonic frequency is $f(k)=k\cdot f_s/(M\cdot P)$; and the lower and upper limits of the harmonic frequency index summation for the head h, and the resonance j are $k_1(h,j)$ and $k_2(h,j)$, respectively.

As an illustrative example, consider a case where the harmonic frequency spacing df=25 Hz, the sampling rate fs=15 kHz, the number of servo sectors n=60, and measurements are made for P=10 revolutions. In this illustrative example, the E-block M-mode disturbance resonance frequency at 5,900+/−80 Hz has frequency index k in an approximate range of 232≦k≦240.

FIG. 7 illustrates in flow diagram form the process 500 for calculating the center frequency of resonant disturbances and for computing discrete fourth-order elliptic notch filter coefficients. Process 500 begins at step 502, where a transducer head h and a resonant disturbance j are selected and their corresponding lower and upper harmonic frequency indices k1 and k2 are calculated. Process 500 then proceeds to step 504.

At step 504, the corresponding previously stored estimated resonance frequency $\bar{f}(h,j)$ and the currently computed and stored harmonic magnitudes $|X(h,j,k)|$, from block 412 of process 400, are retrieved from block 506. Step 504 then uses Equation I to estimate the resonant disturbance frequency $\hat{f}(h,j)$ using the differential-centroid estimation method as represented in the above Equation I. Process 500 then proceeds to step 508, where the resonant disturbance frequency estimates obtained in block 304 are stored.

Process 500 then proceeds to step 510, where two adjacent estimated resonant frequencies, f1 and f2, are selected from those stored in block 308. Process 500 then proceeds to step 512, where the two selected estimated resonant frequencies are used to compute discrete elliptic notch filter frequency coefficients. The computed notch filter coefficients are then stored in a memory at step 514.

Process 500 then proceeds to step 516. If the disk drive system has additional transducer heads for which elliptic notch filters are to be generated, steps 502 through 514 are repeated for all transducer heads and all predetermined responses as indicated by selected head h as selected resonance index j values.

If there are no transducer heads remaining for which calculations are required, process 500 proceeds to step 518. At step 518, the previously computed coefficients are retrieved from block 514 and used to generate one or more elliptic notch filters, depending on the transducer head and its physical track radii at the present time.

At step 512, process 500 uses a method herein referred to as the "zero-placement" method to compute discrete fourth-order elliptic transfer function coefficients whereby the transfer function's local zero-notches will be placed at selected adjacent estimated resonance frequencies f1 and f2. The "zero placement" method utilizes a fourth-order notch transfer function property wherein the roots of the transfer function denominator have the same damping ratio q. In one embodiment, by employing the "zero placement" method, the continuous transfer function can be expressed by the following Equation II:

$$H(s)=Ka*(s^2+O1^2)*(s^2+O2^2)/(s^2+q*O1*s+O1^2)*(s^2+q*O2*s+O2^2). \qquad \text{Equation II}$$

where $O1=2*\pi*f1$; and $O2=2*\pi*f2$.

The notch transfer function property wherein the roots of the denominator have the same damping ration of q can also be extended to higher-order notch filters. A brief summary of the "zero-placement" method is included and described below for reference.

Assume that we want to place the notch-zeros directly at the estimated resonance frequencies $\bar{f}(h,j)$. Each fourth-order elliptic notch-filter transfer function Hi(s), i=1, 2, ..., requires a pair of adjacent estimated resonant frequencies, f1 and f2. Per Equation II above, the continuous transfer function of the elliptic notch filter can be expressed as follows:

$$H(s)=Ka*(s^2+O1^2)*(s^2+O2^2)/(s^2+q*O1*s+O1^2)*(s^2+q*O2*s+O2^2).$$

where $O1=2*\pi*f1$; and $O2=2*\pi*f2$.

The damping ratio, where q is equal to twice the damping ratio, zeta, can be expressed by the following Equation III:

$$q=A1*sqrt(B0)*(O2-O1)/A0*(O2+O1), \qquad \text{Equation III}$$

and the value of O0 for the center frequency f0 of the global notch can be expressed by the following Equation IV:

$$O0=sqrt(O1*O2)=sqrt(O1*Ou). \qquad \text{Equation IV}$$

where again $O1=2*\pi*f1$; and $O2=2*\pi*f2$.

The coefficients (H0, B0, A0, A1) for the second-order elliptic lowpass filter prototype used (i.e., the amount of passband ripple Rp and stopband attenuation Rs) are well-known coefficients from filter-design tables.

The fourth-order elliptic notch transfer function H(s) in Equation II can be decomposed into two second-order elliptic transfer functions H1(s) and H2(s) as expressed by the following Equation V:

$$H(s)=H1(s)*H2(s), \qquad \text{Equation V}$$

where the second-order elliptic transfer functions Hi(s) have the convenient form expressed by the following Equation VI:

$$Hi(s) = \text{sqrt}(H0 * B0/A0) * (s^2 + Oi^2)/(s^2 + q*Oi*s + Oi^2), i=1,2. \quad \text{Equation VI}$$

Applying the matched-z transform, the discrete equivalent transfer functions Hi(z), at a sampling rate fs, are expressed by the following Equation VII:

$$Hi(z) = Kdi * (z^2 + bi1*z + bi2)/(z^2 + ai1*z + ai2), i=1,2. \quad \text{Equation VII}$$

The discrete numerator and denominator can be computed directly, on-line if needed, using the following Equations VIII, IX and X:

$$bi1 = -2*\cos(Oi/fs), \quad \text{Equation VIII}$$

and $$ai1 = -2*\exp(-q*Oi/(2*fs))*\cos(\text{sqrt}(1-q^2/4)*Oi/fs), \quad \text{Equation IX}$$

and $$bi2 = ai2 = \exp(-q*Oi/fs), \quad \text{Equation X}$$

where $Oi = 2*pi*fi, i=1,2$; and where the coefficient q is computed using Equation III. The discrete gain Kdi is matched at DC (i.e., z=1, for convenience here) and is expressed by the following Equation XI:

$$Kdi = \text{sqrt}(H0*B0/A))*(1+ai1+ai2)/1+bi1+bi2), i=1,2. \quad \text{Equation XI}$$

It is also recognized that the gain matching could more preferably be done at the center frequency f0 of the global notch.

An illustrative example of the design a fourth-order digital elliptic notch filter is included and described below to demonstrate the present invention. The example fourth-order filter is to have a maximum passband ripple Rp=0.5 dB and a minimum stopband attenuation Rs=20 dB. The deep local zero-notches are to be placed at 5,900 Hz and 6,300 Hz. The sampling rate is 15 kHz.

First, using the given design specifications, the second-order elliptic lowpass prototype filter transfer function is determined:

$$H2(s) = H0*(s^2 + B0/(s^2 + A1*s + A0)$$

For Rp=0.5 dB and Rs=20 dB, the coefficients become H0=0.1, B0=14.7433, A1=1.3430, and A0=1.5616. The local radian notch frequencies become $$O1 = 2*\pi*5,900, \text{ and } O2 = 2*\pi*6,300.$$

From Equation III we find that the damping q is equal to q=0.1691 (zeta=0.0846).

The discrete numerator and denominator coefficients in Equations VIII, IX, and X are then determined. The two matched discrete gain constants for the two subsections are found from Equation XI and are equal to Kd1=0.7981 and Kd2=0.7877.

Finally, from Equation VII, the numerical values for the two transfer functions of the subsections are expressed as follows:

$$H1(z) = (0.7981*z^2 + 1.2510*z + 0.7981)/(z^2 + 1.2719*z + 0.6585), \text{ and}$$

$$H2(z) = (0.7877*z^2 + 1.3805*z + 0.7877)/(z^2 + 1.4022*z + 0.6401).$$

In conclusion, the actuator servo control system according to the present invention provides more effective attenuation of resonant disturbances present in disk drive servo systems by performing a continuous in situ analysis of transducer head position error signals (PES) to identify dynamic resonant disturbance frequencies and by tuning digital elliptic notch filters to attenuate the identified resonant disturbance frequencies. Adaptive tuning of elliptic notch filters to match dynamic resonant disturbance frequencies provides more effective attenuation of resonant disturbances than use of static filters tuned to match predetermined resonant disturbances. Additionally, by utilizing elliptic notch filters, the present invention improves servo system stability by preserving the servo system's phase-margin.

Although specific embodiments have been illustrated and described herein for purposes of description of the preferred embodiment, it will be appreciated by those of ordinary skill in the art that a wide variety of alternate and/or equivalent implementations calculated to achieve the same purpose may be substituted for the specific embodiments shown and described without departing from the scope of the present invention. Those with skill in the chemical, mechanical, electromechanical, electrical, and computer arts will readily appreciate that the present invention may be implemented in a wide variety of embodiments. This application is intended to cover any adaptations or variations of the preferred embodiments discussed herein. Therefore, it is manifestly intended that this invention be limited only by the claims and the equivalents thereof.

What is claimed is:

1. A disk drive comprising:
    an actuator servo control system including:
        at least one disk having a plurality of radially-situated data tracks, an actuator structure comprising at least one transducer head for writing and/or reading data from the disk surface, a suspension, an arm structure and a voice coil motor, and providing a transducer head position error signal (PES);
        a servo compensator applying a servo-control algorithm to the PES to thereby produce a servo control signal; and
        an adaptive resonant disturbance attenuator adapted to analyze the PES for a transducer head at a data track radii, identify resonant disturbances present in the PES, select two adjacent resonant disturbances having a first and second resonant frequency, ascertain coefficients of at least a fourth-order elliptic notch filter transfer function having a first zero-notch with a frequency substantially at the first resonant disturbance frequency and a second zero-notch with a frequency substantially at the second resonant disturbance frequency, apply the ascertained coefficients to the at least fourth-order elliptic notch filter transfer function to thereby generate a tuned fourth-order digital elliptic notch filter, and apply the tuned fourth-order digital elliptic notch filter in the servo system to thereby substantially attenuate the selected adjacent resonant disturbances.

2. The disk drive of claim 1, wherein the adaptive resonant disturbance attenuator analyzes the position error signals for a plurality of transducer heads at one or more selected data track radii and generates a plurality of tuned fourth-order digital elliptic notch filters to thereby substantially attenuate a plurality of selected resonant disturbances associated with each transducer head at each selected track radii.

3. The disk drive of claim 1, wherein the adaptive resonant disturbance attenuator applies the tuned fourth-order digital elliptic notch filter to the PES to thereby substantially attenuate from the PES the selected adjacent resonant disturbances.

4. The disk drive of claim 1, wherein the adaptive resonant disturbance attenuator applies the tuned fourth-order digital elliptic notch filter to the servo control signal to thereby substantially attenuate from the servo control signal the selected adjacent resonant disturbances.

5. The disk drive of claim 1, wherein the ascertained coefficients are stored in a memory.

6. The disk drive of claim 1, wherein the adaptive resonant disturbance attenuator comprises:
   a spectral disturbance frequency analyzer,
   a notch filter coefficient controller, and
   a tunable digital elliptic notch filter.

7. The disk drive of claim 6, wherein the spectral disturbance frequency analyzer measures the PES for a transducer head at a data track radii, computes from the PES a non-repeatable position error signal (NRRO), and computes from the NRRO a spectrum of estimated resonant disturbance frequencies present in the NRRO.

8. The disk drive of claim 7, wherein the spectral disturbance frequency analyzer analyzes a limited number of predetermined frequency bands within the NRRO to compute the spectrum of estimated resonant disturbance frequencies present in the NRRO.

9. The disk drive of claim 7, wherein the notch filter coefficient controller analyzes the spectrum of estimated resonant disturbance frequencies, estimates the frequencies of resonant disturbances present in the spectrum of disturbance frequencies, selects two adjacent resonant disturbances having a first and second resonant frequency, and ascertains coefficients of a fourth-order elliptic notch filter transfer function having a first zero-notch with a frequency substantially at the frequency of the first selected resonant disturbance frequency and a second zero-notch with a frequency substantially at the frequency of the second selected resonant disturbance frequency.

10. The disk drive of claim 6, wherein the tunable digital elliptic notch filter receives the ascertained coefficients from the notch filter coefficient controller, applies the coefficients to a fourth-order elliptic notch filter transfer function to thereby generate a tuned fourth-order digital elliptic notch filter having a first zero-notch with a frequency substantially at the first selected resonant disturbance frequency and a second zero-notch with a frequency substantially at the second selected resonant disturbance frequency, and applies the tuned fourth-order digital elliptic notch filter to the servo system to thereby substantially attenuate the selected adjacent resonant disturbances.

11. An adaptive resonant disturbance attenuator connectable to a disk drive servo system, the attenuator comprising:
   a frequency analyzer for analyzing a position error signal of a transducer head at a data track radii and identifying resonant disturbances present in the position error signal;
   a notch filter coefficient controller for selecting two identified adjacent resonant disturbances having a first and second resonant frequency and ascertaining coefficients of at least a fourth-order elliptic notch filter transfer function having a first zero-notch with a frequency substantially at the first resonant disturbance frequency and a second zero-notch with a frequency substantially at the second resonant disturbance frequency; and
   a tunable elliptic notch filter for applying the ascertained coefficients to at least a fourth-order elliptic notch filter transfer function to thereby generate a fourth-order digital elliptic notch filter and applying the generated digital elliptic notch filter in the servo system to thereby substantially attenuate the selected adjacent resonant disturbances.

12. A disk drive comprising:
   an actuator servo control system including:
      at least one disk having a plurality of radially-situated data tracks, an actuator structure comprising at least one transducer head for writing and/or reading data from the disk surface, a suspension, an arm structure and a voice coil motor, and providing a transducer head position error signal (PES);
      a servo compensator applying a servo-control algorithm to the PES to thereby produce a servo control signal; and
      an adaptive resonant disturbance attenuator adapted to analyze the PES for a transducer head at a data track radii, identify resonant disturbances present in the PES, select a resonant disturbance having a first resonant frequency, ascertain coefficients of at least a second-order notch filter transfer function having a first zero-notch with a frequency substantially at the first resonant disturbance frequency, apply the ascertained coefficients to the at least second-order notch filter transfer function to thereby generate a tuned at least second-order digital notch filter, and apply the tuned at least second-order digital notch filter in the servo system to thereby substantially attenuate the selected resonant disturbance.

13. The disk drive of claim 12, further comprising:
   a tuned second-order digital notch filter in addition to the adaptive resonant disturbance attenuator.

14. The disk drive of claim 13, wherein the adaptive resonant disturbance attenuator analyzes the position error signals for a plurality of transducer heads at one or more selected data track radii and generates a plurality of tuned second-order digital notch filters to thereby substantially attenuate a plurality of selected resonant disturbances associated with each transducer head at each selected track radii.

15. A method of attenuating resonant disturbances in a disk drive comprising at least one disk having a plurality of radii and an actuator servo control system including a servo compensator and an actuator structure having at least one transducer head for writing and/or reading data from the disk surface, a suspension, an arm structure and a voice coil motor, and providing a transducer head position error signal (PES), the method comprising:
   analyzing the PES for a transducer head at a disk radii;
   identifying resonant disturbances present in the PES;
   selecting at least two adjacent resonant disturbances having a first and second resonant frequency;
   ascertaining coefficients of at least a fourth-order elliptic notch filter transfer function having a first zero-notch with a frequency substantially at the first resonant disturbance frequency and a second zero-notch with a frequency substantially at the second resonant disturbance frequency; and
   applying the ascertained coefficients to the at least fourth-order elliptic notch filter transfer function, thereby generating a tuned fourth-order digital elliptic notch filter; and
   applying the tuned fourth-order digital elliptic notch filter in the servo system to thereby substantially attenuate the selected adjacent resonant disturbances.

16. The method of claim 15, the method further comprising:
   analyzing position error signals for a plurality of transducer heads at one or more selected data track radii; and
   generating a plurality of tuned fourth-order digital elliptic notch filters to thereby substantially attenuate selected resonant disturbances associated with each transducer head at each selected track radii.

17. The method of claim 15, the method further comprising:
applying the tuned fourth-order digital elliptic notch filter to the position error signal to thereby substantially attenuate the selected resonant disturbances from the position error signal.

18. The method of claim 15, the method further comprising:
applying the tuned fourth-order digital elliptic notch filter to the servo control signal to thereby substantially attenuate the selected resonant disturbance frequencies from the servo control signal.

19. The method of claim 15, the method further comprising:
storing the ascertained coefficients in a memory.

20. The method of claim 15, the method further comprising:
measuring the position error signal for a transducer head at a data track radii;
computing from the measure position error signal a non-repeatable position error signal (NRRO); and
computing from the NRRO a spectrum of estimated resonant disturbance frequencies present in the NRRO.

21. The method of claim 20, the method further comprising:
analyzing and computing from a predetermined number of frequency ranges with the NRRO a spectrum of resonant disturbance frequencies present in the NRRO.

22. The method of claim 20, the method further comprising:
calculating from the spectrum of estimated resonant disturbance frequencies the center of each resonant disturbance frequency;
selecting two adjacent resonant disturbance frequencies having a first and a second resonant frequency; and
ascertaining coefficients of a fourth-order elliptic notch filter transfer function having a first zero-notch with a frequency substantially at the frequency of the first selected resonant disturbance frequency and second zero-notch with a frequency substantially at the frequency of the second selected resonant disturbance frequency.

23. The method of claim 22, the method further comprising:
applying the ascertained coefficients to a fourth-order elliptic notch filter transfer function to thereby generate a tuned fourth-order digital elliptic notch filter having a first zero-notch with frequency substantially at the first selected resonant disturbance frequency and a second zero-notch with a frequency substantially at the second selected resonant disturbance frequency; and
applying the generated fourth-order elliptic notch filter to the servo system to thereby substantially attenuate the selected adjacent resonant disturbances from the servo system.

* * * * *